US006705836B2

(12) United States Patent
Bourriaud et al.

(10) Patent No.: US 6,705,836 B2
(45) Date of Patent: Mar. 16, 2004

(54) GAS TURBINE BLADE COOLING CIRCUITS

(75) Inventors: Isabelle Bourriaud, Dammarie-les-Lys (FR); Patrice Eneau, Le Mee-sur-Seine (FR); Philippe Picot, Le Chatelet-en-Brie (FR)

(73) Assignee: Snecma Moteurs, Paris (FR)

( * ) Notice: Subject to any disclaimer, the term of this patent is extended or adjusted under 35 U.S.C. 154(b) by 17 days.

(21) Appl. No.: 10/227,810

(22) Filed: Aug. 27, 2002

(65) Prior Publication Data

US 2003/0044277 A1 Mar. 6, 2003

(30) Foreign Application Priority Data

Aug. 28, 2001 (FR) ............................................. 01 11188

(51) Int. Cl.$^7$ ................................................. F01D 5/18
(52) U.S. Cl. ................................... 416/97 R; 415/115
(58) Field of Search ............................... 415/115, 116; 416/96 R, 96 A, 97 R

(56) References Cited

U.S. PATENT DOCUMENTS

| | | | | |
|---|---|---|---|---|
| 3,191,908 A | * | 6/1965 | Powell et al. | ............. 416/96 R |
| 3,628,885 A | * | 12/1971 | Sidenstick et al. | ........ 416/97 R |
| 5,193,980 A | * | 3/1993 | Kaincz et al. | ............ 416/97 R |
| 5,348,446 A | | 9/1994 | Lee et al. | |
| 5,660,524 A | | 8/1997 | Lee et al. | |
| 5,702,232 A | * | 12/1997 | Moore | ....................... 416/97 R |
| 5,720,431 A | * | 2/1998 | Sellers et al. | ............. 416/97 R |
| 5,813,835 A | * | 9/1998 | Corsmeier et al. | ........ 416/97 R |
| 6,168,381 B1 | * | 1/2001 | Reddy | ...................... 416/97 R |

FOREIGN PATENT DOCUMENTS

| | | | | |
|---|---|---|---|---|
| EP | 1 065 343 | | 1/2001 | |
| FR | 2 798 422 | | 3/2001 | |
| JP | 57-153903 A | * | 9/1982 | ............... 416/97 R |
| WO | WO 98/45577 | | 10/1998 | |

* cited by examiner

*Primary Examiner*—Christopher Verdier
(74) *Attorney, Agent, or Firm*—Oblon, Spivak, McClelland, Maier & Neustadt, P.C.

(57) ABSTRACT

A gas turbine blade for an airplane engine, the blade comprising at least a first cooling circuit comprising at least a concave side cavity extending radially beside the concave face of the blade, at least a second cooling circuit comprising at least one convex side cavity extending radially beside the convex face of the blade, and at least one third cooling circuit comprising at least one central cavity situated in the central portion of the blade between the concave side cavity and the convex side cavity, at least one leading edge cavity situated in the vicinity of the leading edge of the blade, communication orifices opening out into the central cavity and into the leading edge cavity, and outlet orifices opening out into the leading edge cavity and through the leading edge of the blade.

10 Claims, 4 Drawing Sheets

GAS TURBINE BLADE COOLING CIRCUITS

BACKGROUND OF THE INVENTION

The present invention relates to improvements made to gas turbine blades for an airplane engine. More particularly, the invention relates to the cooling circuits of such blades.

It is known that the moving blades of an airplane engine gas turbine, and in particular of the high pressure turbine, are subjected to very high temperatures from combustion gases when the engine is in operation. These temperatures reach values that are well above those that can be withstood without damage by the various pieces that come into contact with these gases, thereby limiting the lifetime of such pieces.

Furthermore, it is known that raising the temperature of the gases in a high pressure turbine improves the efficiency of an engine, and thus the ratio of engine thrust over the weight of an airplane propelled by the engine. Consequently, efforts are made so as to provide turbine blades that are capable of withstanding higher and higher temperatures.

In order to solve this problem, it is known to provide such blades with cooling circuits seeking to reduce the temperature of the blades. By means of such circuits, cooling air, generally inserted into the blade via its root, passes through the blade following a path defined by cavities formed inside the blade prior to being ejected via orifices opening through the surface of the blade.

By way of example, a method is known which consists in providing the blade with a central cavity fed with cooling air from the root of the blade so as to "impact" the leading edge thereof. However, since said cavity is separated from the hot gases solely by the wall of the blade, the air passing along the cavity heats up as it approaches the leading edge.

U.S. Pat. No. 5,720,431 discloses a blade provided with a central cavity surrounded by radial cavities situated on the concave and convex sides of the blade. That document also provides communication orifices enabling cooling air to pass between the central cavity and the radial cavities so that the air which passes through the radial cavities heats up little and loses little of its effectiveness in protecting the leading edge against hot gases.

OBJECT AND SUMMARY OF THE INVENTION

The present invention thus seeks to mitigate those drawbacks by proposing improvements to gas turbine blades, and more particularly to the cooling circuits thereof, so as to limit the temperature of the leading edges of such blades. This has the consequence of increasing the lifetime of such blades.

To this end, the invention provides a gas turbine blade for an airplane engine, the blade comprising at least a first cooling circuit comprising at least a concave side cavity extending radially beside the concave face of the blade, at least a second cooling circuit independent of the first cooling circuit comprising at least one convex side cavity extending radially beside the convex face of the blade, and at least one third cooling circuit independent of the first and second cooling circuits and comprising at least one central cavity situated in the central portion of the blade between the concave side cavity and the convex side cavity, at least one leading edge cavity situated in the vicinity of the leading edge of the blade, communication orifices opening out into the central cavity and into the leading edge cavity, and outlet orifices opening out into the leading edge cavity and through the leading edge of the blade.

The presence of cavities surrounding the central cavity of the blade and the use of independent cooling circuits for the various cavities enables the blade to be protected in substantially uniform manner all along its height. As a result, the leading edge of the blade benefits from lower temperature cooling air.

In addition, in the central portion of the blade, the cooling of the convex and concave faces of the blade is provided by two completely independent circuits, thereby making it possible to control the concave and convex side temperatures of the blade independently by controlling the flow rate of cooling air traveling in each of the two circuits.

In addition, there is no radial air circulation in the cavity situated in the vicinity of the leading edge. The cooling air is exhausted directly into the combustion stream via the outlet orifices positioned in the leading edge of the blade, thus serving to avoid disturbing the effect of the impact jets by a shearing flow.

BRIEF DESCRIPTION OF THE DRAWINGS

Other characteristics and advantages of the present invention appear from the following description given with reference to the accompanying drawings which show an embodiment that is not limiting in any way. In the figures.

DETAILED DESCRIPTION OF AN EMBODIMENT

Figure 1:
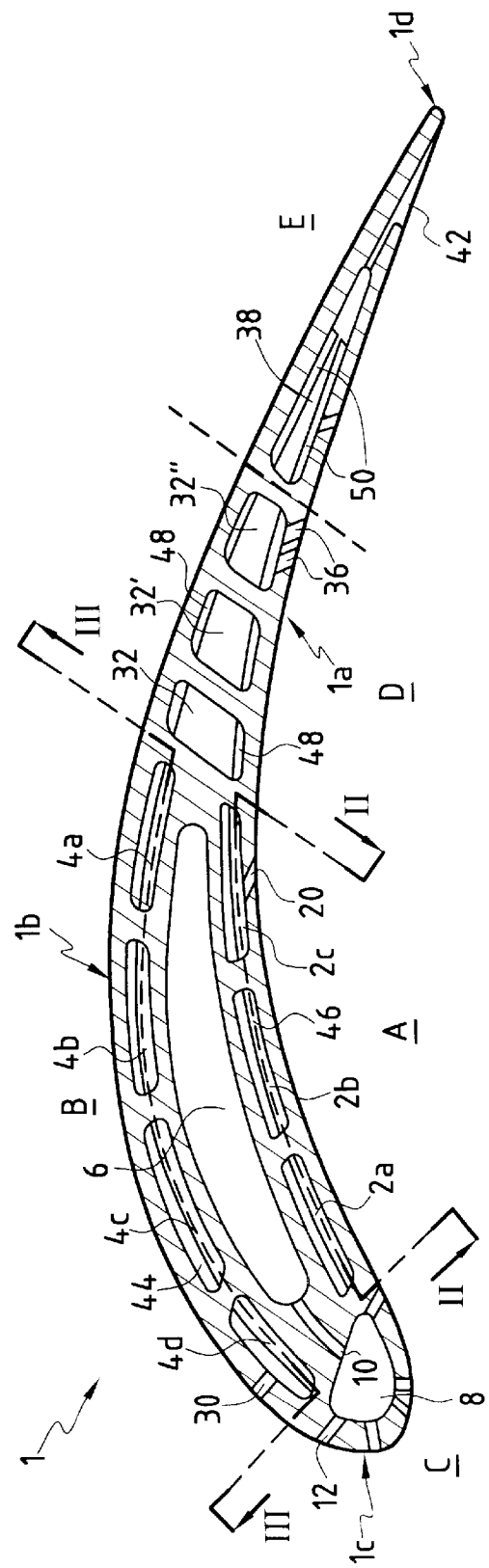
FIG. 1 is a section view through a moving blade of a gas turbine and constituting an embodiment of the invention.

With reference to FIG. 1, it can be seen that the blade 1 of a gas turbine of an airplane engine constituting an embodiment of the invention comprises, in its central portion, first and second cooling circuits A and B respectively that are independent from each other. The first circuit A comprises at least one cavity on the concave side and preferably a plurality of cavities, for example three concave side cavities 2a, 2b, and 2c extending radially beside the concave face 1a of the blade 1. The second cooling circuit B comprises at least one convex side cavity, and preferably a plurality, for example four convex side cavities 4a to 4d, extending radially beside the convex face 1b of the blade.

These circuits serve to cool respectively the concave face and the convex face of the blade 1 in a mode of operation that is described in greater detail below.

Figure 2:
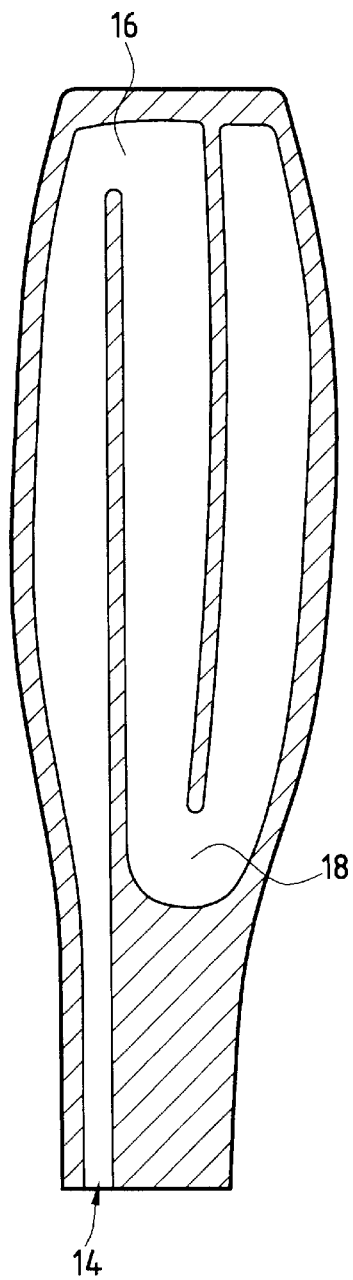
FIG. 2 is a section view of FIG. 1 on section line II—II.

As shown more precisely in FIG. 2, at least one air admission opening 14 is provided at a radial end of a concave side cavity 2a beside the root of the blade in order to feed the first cooling circuit A with cooling air.

A first passage 16 puts the other radial end of the concave side cavity 2a adjacent to the tip of the blade into communication with an adjacent radial end of a second concave side cavity 2b. A second passage 18 is also provided beside the root of the blade to put the other radial end of the concave side cavity 2b into communication with an adjacent radial end of a third concave side cavity 2c. In addition, outlet orifices 20 open into said concave side cavity 2c and open out into the concave face 1a of the blade.

Advantageously, the concave side cavities 2a, 2b, and 2c of this first cooling circuit A include baffles 46 on their outer wall adjacent to the concave face of the blade so as to increase heat transfer along said wall while reducing head losses.

The baffles are in the form of portions in relief positioned on the cavity walls extending across the cooling air flow. They thus serve to disturb the flow of air through the cavities, and thus increase heat exchange.

Figure 3:
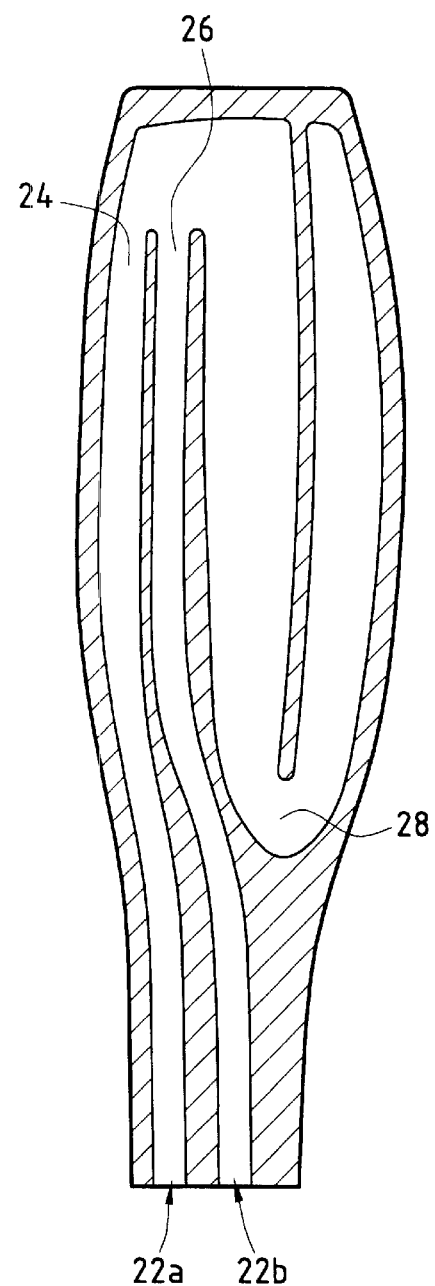
FIG. 3 is a section view of FIG. 1 on section line III—III.

The second cooling circuit B is fed independently of the first circuit A. As shown in FIG. 3, it advantageously comprises four convex side cavities 4a, 4b, 4c, and 4d and at least two air admission openings 22a and 22b at respective radial ends of two convex side cavities 4a and 4b that are adjacent to the root of the blade.

Furthermore, first and second passages 24 and 26 put the opposite radial ends of the cavities 4a and 4b respectively into communication with an adjacent radial end of a third convex side cavity 4c. A third passage 28 puts the opposite radial end of the convex side cavity 4c into communication with an adjacent radial end of the fourth convex side cavity 4d.

Finally, outlet orifices 30 are also provided opening out into said convex side cavity 4d and opening out through the convex face 1c of the blade 1 in the vicinity of its leading edge.

The convex side cavities 4a to 4d preferably include baffles 44 on their outside walls adjacent to the convex face in order to improve heat transfer along said walls.

Advantageously, the concave side cavities 2a to 2c of the first cooling circuit A and the convex side cavities 4a to 4d of the second circuit B are of high aspect ratio so as to increase internal heat transfer. A cooling cavity is considered as having an aspect ratio that is high when, in cross-section, it presents one dimension (length) that is at least three times greater than its other dimension (width).

The convex and concave faces of the blade are thus cooled in entirely independent manner by using two distinct circuits A and B, i.e. there is no flow of cooling air from one circuit to the other. Thus, it is possible to control independently the temperature of the concave and convex faces of the blade by means of the air flow traveling along each of these two circuits.

Furthermore, between the first and second circuits A and B, the blade 1 also presents a third cooling circuit C which is independent of the other two. This third cooling circuit C comprises in particular at least one central cavity 6 situated in the central portion of the blade between the concave side cavities 2a to 2c and the convex side cavities 4a to 4d. A leading edge cavity 8 provided with smooth walls and situated in the vicinity of the leading edge 1c of the blade communicates with the central cavity 6 via communication orifices 10. Furthermore, outlet orifices 12 opening out into the leading edge cavity 8 and into the leading edge of the blade are also provided.

Figure 4:
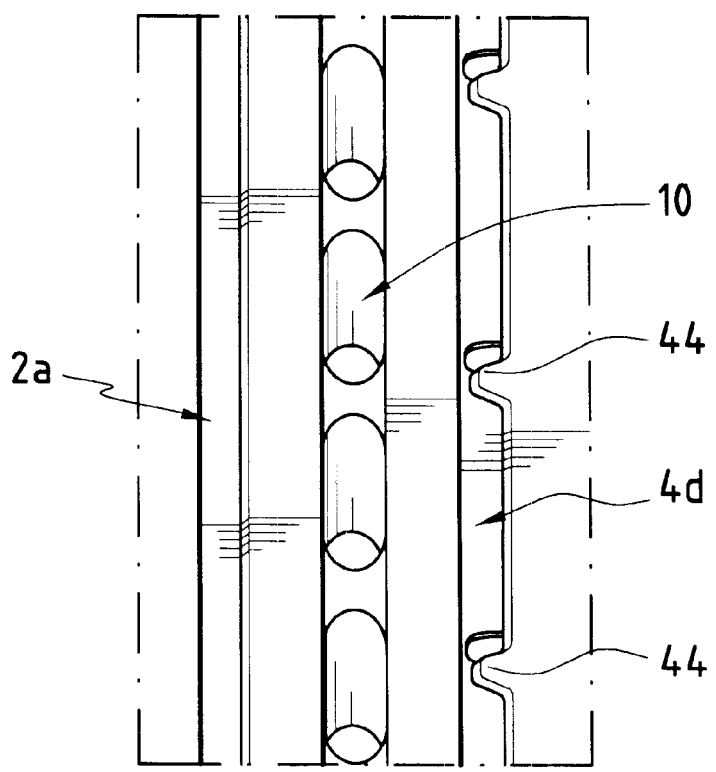
FIG. 4 is an enlarged view of impact orifices placed between the central cavity and the leading edge cavity of the blade of the present invention.

The leading edge 1c of the blade is cooled by impact jets fed via the central cavity 6. As shown in FIG. 4, the central cavity 6 and the leading edge cavity 8 advantageously communicate with each other via oblong impact orifices 10. The dimensional parameters (length, width, and radius) of these oblong orifices are determined as a function of the requirements of the circuit so as to optimize heat exchange due to cooling air impacting against the leading edge wall 1c. The oblong shape serves to avoid having sharp angles and thus to eliminate any risk of cracking while the circuit is being cast.

In addition, the cooling air feeding the central cavity is emitted solely to the leading edge of the blade through the impact orifices in this cavity. The flow rate passing through this circuit is thus independent of the static pressure field on the vane of the blade. The distribution of the flow passing through the impact orifices is also uniform over its height.

The central cavity 6 is also protected from the hot gases by being positioned between the other two circuits A and B, such that the air which passes through it is heated to a small extent only thus enabling the leading edge to benefit from cooling air at lower temperature.

The blade in this embodiment of the invention also has at least one additional fourth cooling circuit D in its trailing portion. This circuit is independent of the first, second, and third cooling circuits A, B, and C. It is constituted by at least one cavity, and preferably by a plurality of cavities, e.g. three cavities 32, 32', 32" situated in the rear portion of the blade 1, with an air admission opening (not shown) at one radial end of the cavity 32 beside the root of the blade, and outlet orifices 36 opening out into the cavity 32" and through the concave face 1a of the blade.

Advantageously, the cavities 32, 32', 32" of the fourth cooling circuit D include baffles 48 positioned facing one another on the concave and convex side walls of the blade so as to improve heat transfers along said walls.

Finally, at least one additional fifth cooling circuit E is provided which is independent of the other four cooling circuits A to D. This circuit serves to cool the trailing edge 1d of the blade 1.

The fifth cooling circuit E comprises at least one trailing edge cavity 38 situated in the vicinity of the trailing edge 1d of the blade, an air admission opening (not shown) at a radial end of the trailing edge cavity adjacent to the root of the blade to feed this circuit E with cooling air, and outlet orifices 42 opening out into the trailing edge cavity and into the trailing edge 1d of the blade.

The trailing edge cavity 38 preferably also includes baffles 50 disposed facing one another on the concave and convex side walls of the blade so as to improve heat transfer along these walls.

Figure 5:
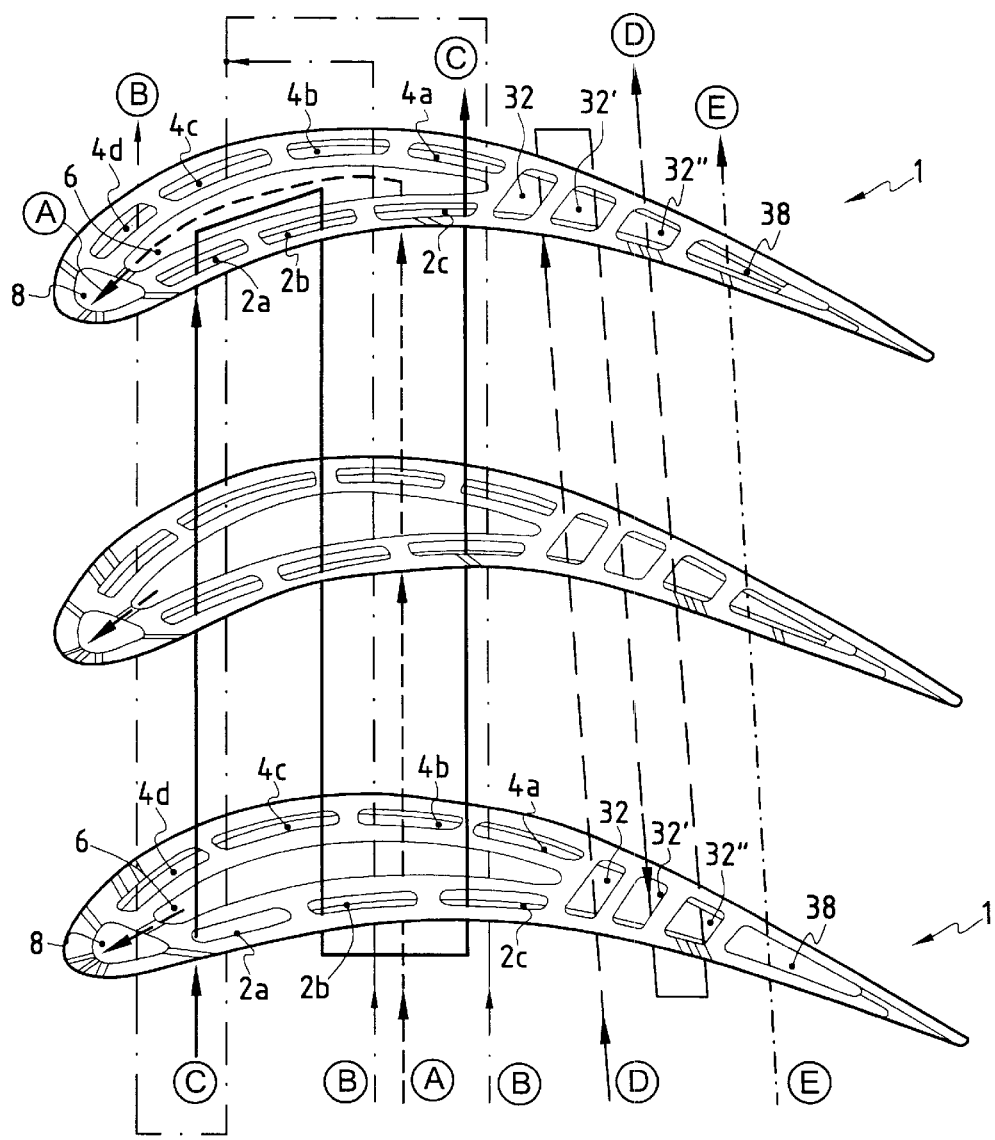
FIG. 5 shows the cooling air circulation which is associated with the various cooling circuits of the FIG. 1 blade.

The method of cooling the blade stems clearly from the above description, and it is described briefly below with reference more particularly to FIG. 5.

This figure is a diagram of the cooling air circulation traveling along the various cooling circuits A to E in the blade of the present invention. These five circuits are independent of one another since each of them has its own direct cooling air feed.

The first cooling circuit A is fed with cooling air via the concave side cavity 2a. The cooling air then travels along the concave side cavity 2b and then along the third concave side cavity 2c prior to being exhausted through the concave face of the blade via the outlet orifices 20 from said cavity.

The second cooling circuit B is simultaneously fed with cooling air via two convex side cavities 4a and 4b. The dual deflection at the tip of the blade returns this air via a down cavity 4c. Thereafter the air feeds an up cavity 4d prior to being exhausted through the convex face 1b of the blade via the outlet orifices 30 from said cavity.

For the third cooling circuit C, the central cavity 6 is fed directly from the root of the blade and serves to feed the leading edge cavity 8 via the oblong impact orifices 10. Outlet orifices 12 open out through the leading edge 1c of the blade and enable it to be cooled.

The rear portion of the blade 1 is cooled by a fourth circuit D comprising three cavities 32, 32', and 32". As shown in FIG. 5, the cooling air feeds one of the cavities 32, a deflection at the tip of the blade returns the air via the cavity 32', after which the air feeds the up cavity 32'' prior to being exhausted through the concave face via outlet orifices 36.

Finally, the trailing edge 1d of the blade is cooled by the fifth cooling circuit E whose trailing edge cavity 38 is fed directly with cooling air.

The present invention as described above provides numerous advantages, and in particular the small cavities present surrounding the central cavity enable the central cavity to be isolated from the hot gases. Under such conditions, the air passing along the central cavity is heated to a much smaller extent than in conventional technologies, and the tip sections of the blades thus benefit from lower temperature cooling air.

Furthermore, the temperature of the leading edge wall of the blade is lower, thus giving it longer lifetime and better resistance to oxidation of its metal wall and also to flaking of any heat barrier, in a zone that is particularly exposed.

In the cooling circuits for the central portion of the blade, baffles are positioned solely on the outside faces of the cavities. They serve firstly to increase heat exchange through these partitions and thus to reduce the temperature levels of the outside walls of the blade, and secondly to benefit from optimized levels of head loss.

The points mentioned above make it possible to benefit from uniform cooling of the leading edge of the blade over the height of the blade in terms of cooling flow and of temperature level. The temperature of the metal constituting the leading edge of the blade is thus lower which makes it possible to provide the blade with a longer lifetime.

Naturally, the present invention is not limited to the embodiments described above but covers any variant thereof. In particular, such cooling circuits may be installed both in fixed blades and in moving blades.

What is claimed is:

1. A gas turbine blade for an airplane engine, the blade having at least a first cooling circuit comprising at least a concave side cavity extending radially beside the concave face of the blade, at least a second cooling circuit independent of the first cooling circuit comprising at least one convex side cavity extending radially beside the convex face of the blade, and at least one third cooling circuit independent of the first and second cooling circuits and comprising at least one central cavity situated in the central portion of the blade between the concave side cavity and the convex side cavity, at least one leading edge cavity situated in the vicinity of the leading edge of the blade, communication orifices opening out into the central cavity and into the leading edge cavity, and outlet orifices opening out into the leading edge cavity and through the leading edge of the blade.

2. A blade according to claim 1, wherein the first cooling circuit comprises at least three concave side cavities, at least one air admission opening at a radial end of a first concave side cavity for feeding the first cooling circuit with cooling air, a first passage putting the other radial end of the first concave side cavity into communication with an adjacent radial end of a second concave side cavity, a second passage putting the other radial end of the second concave side cavity into communication with an adjacent radial end of a third concave side cavity, and outlet orifices opening out into the third radial cavity and through the concave face of the blade.

3. A blade according to claim 1, wherein the second cooling circuit comprises at least four convex side cavities, at least two air admission openings at a radial end of first and second convex side cavities to feed the second cooling circuit with cooling air, first and second passages putting the respective other radial ends of the first and second convex side cavities respectively into communication with an adjacent radial end of a third convex side cavity, a third passage putting the other radial end of the third convex side cavity into communication with an adjacent radial end of a fourth convex side cavity, and outlet orifices opening out into the fourth convex side cavity and through the convex face of the blade.

4. A blade according to claim 1, further comprising at least one additional fourth cooling circuit independent of the first, second, and third cooling circuits, and comprising at least one cavity situated in the rear portion of the blade, an air admission opening at a radial end of the cavity for feeding the fourth cooling circuit, and outlet orifices opening out into said cavity and through the concave face of the blade.

5. A blade according to claim 4, wherein the cavity of the fourth cooling circuit includes baffles positioned facing one another on its concave and convex side walls of the cavity so as to improve heat transfer along its walls.

6. A blade according to claim 1, further comprising at least one additional, fifth cooling circuit independent of the first, second, third, and fourth cooling circuits, comprising at least one cavity situated in the vicinity of the trailing edge of the blade, an air admission opening at a radial end of the trailing edge cavity to feed the fifth cooling circuit, and outlet orifices opening out into said trailing edge cavity and through the trailing edge of the blade.

7. A blade according to claim 6, wherein the trailing edge cavity includes baffles positioned facing one another on its concave and convex side walls so as to improve heat transfer along its walls.

8. A blade according to claim 1, wherein the concave side cavity of the first cooling circuit and the convex side cavity of the second cooling circuit are of large aspect ratio so as to increase internal heat transfer.

9. A blade according to claim 1, wherein the convex side cavity of the second cooling circuit includes baffles on its outer convex side wall so as to increase heat transfer along this wall.

10. A blade according to claim 2, wherein the concave side cavity of the first cooling circuit includes baffles on its outer wall beside the concave face so as to increase heat transfer along said wall while reducing head losses.

* * * * *